United States Patent
Wang

(10) Patent No.: US 11,997,213 B2
(45) Date of Patent: May 28, 2024

(54) VERIFICATION AND ENCRYPTION SCHEME IN DATA STORAGE

(71) Applicant: Visa International Service Association, San Francisco, CA (US)

(72) Inventor: Quan Wang, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 1125 days.

(21) Appl. No.: 16/621,665

(22) PCT Filed: Jun. 23, 2017

(86) PCT No.: PCT/US2017/039132
§ 371 (c)(1),
(2) Date: Dec. 11, 2019

(87) PCT Pub. No.: WO2018/236401
PCT Pub. Date: Dec. 27, 2018

(65) Prior Publication Data
US 2021/0152366 A1    May 20, 2021

(51) Int. Cl.
*H04L 9/08* (2006.01)
*G06F 21/64* (2013.01)
(Continued)

(52) U.S. Cl.
CPC ............ *H04L 9/3247* (2013.01); *G06F 21/64* (2013.01); *H04L 9/0861* (2013.01);
(Continued)

(58) Field of Classification Search
CPC ..................... H04L 9/3247; H04L 9/0861
See application file for complete search history.

(56) References Cited

U.S. PATENT DOCUMENTS 7,083,090 B2    8/2006  Zuili
7,096,494 B1*   8/2006  Chen ................. H04L 9/3247
                                                  380/278
(Continued)

FOREIGN PATENT DOCUMENTS

CN      104574049 A     4/2015
CN      105144216 A    12/2015
(Continued)

OTHER PUBLICATIONS

PCT/US2017/039132, "International Preliminary Report on Patentability", dated Jan. 2, 2020, 10 pages.
(Continued)

*Primary Examiner* — David J Pearson
(74) *Attorney, Agent, or Firm* — Kilpatrick Townsend & Stockton LLP

(57) ABSTRACT

Embodiments of the invention enable a distributed ledger system including a network of entities that maintain an electronic ledger that can keep track of information related to events performed by various entities in the network. An operating entity may manage access to the distributed ledger system and may allow certain authorities and users to onboard with the distributed ledger system. A user device may generate a request to include data in the electronic ledger. The user device may generate a cryptogram and send the cryptogram with the request to a reader device, which may initiate a verification process to verify the cryptogram. If the cryptogram is verified, the data from the user device may be sent to one or more authorities so that it can be included in the electronic ledger.

12 Claims, 6 Drawing Sheets

(51) Int. Cl.
*H04L 9/32* (2006.01)
*G06Q 20/32* (2012.01)
*G06Q 20/38* (2012.01)
*H04L 9/00* (2022.01)

(52) U.S. Cl.
CPC ....... *G06Q 20/327* (2013.01); *G06Q 20/3829* (2013.01); *G06Q 20/389* (2013.01); *G06Q 2220/00* (2013.01); *H04L 9/50* (2022.05)

(56) References Cited

U.S. PATENT DOCUMENTS

| | | | |
|---|---|---|---|
| 2002/0029200 A1 | 3/2002 | Dulin et al. | |
| 2004/0026496 A1 | 2/2004 | Zuili | |
| 2014/0019364 A1 | 1/2014 | Hurry et al. | |
| 2014/0161258 A1* | 6/2014 | Yang | H04W 12/03 380/270 |
| 2015/0324789 A1 | 11/2015 | Dvorak et al. | |
| 2015/0339664 A1* | 11/2015 | Wong | G06Q 20/4015 705/71 |
| 2016/0012432 A1* | 1/2016 | Meshkati | G06Q 20/322 705/44 |
| 2016/0065370 A1* | 3/2016 | Le Saint | H04L 9/0861 713/155 |
| 2016/0253663 A1 | 9/2016 | Clark et al. | |
| 2016/0261409 A1* | 9/2016 | French | H04L 9/3234 |
| 2017/0026380 A1 | 1/2017 | Liebl et al. | |
| 2018/0276666 A1* | 9/2018 | Haldenby | G06Q 20/10 |
| 2019/0362334 A1* | 11/2019 | Wang | G06Q 20/327 |

FOREIGN PATENT DOCUMENTS

| | | |
|---|---|---|
| EP | 2216742 | 8/2010 |
| KR | 1020110090551 | 8/2011 |
| WO | 2017090041 | 6/2017 |

OTHER PUBLICATIONS

SG11201911853T , "Further Written Opinion", dated Jun. 23, 2021, 6 pages.
SG11201911853T , "Written Opinion", dated May 3, 2021, 6 pages.
EP17914162.7 , "Extended European Search Report", dated Apr. 7, 2020, 7 pages.
CN201780092372.3 , "Office Action", dated Mar. 17, 2023, 6 pages.
PCT/US2017/039132 , "International Search Repon and Written Opinion", dated Feb. 22, 2018, 15 pages.
Application No. CN201780092372.3 , Office Action, dated Sep. 23, 2023, 8 pages.

* cited by examiner

VERIFICATION AND ENCRYPTION SCHEME IN DATA STORAGE

CROSS-REFERENCES TO RELATED APPLICATIONS

This application is a National Stage of International Application No. PCT/US2017/039132, filed on Jun. 23, 2017, which is herein incorporated by reference in its entirety for all purposes.

BACKGROUND

Performing in-person authentication processes brings about several issues. For example, in-person authentication processes are cumbersome for the involved entities. For users that need to be authenticated, it is a hassle to have to carry around authentication information (e.g., identification cards, passport, etc.), as well as provide the authentication information during an authentication process. Similarly, such in-person authentication processes are also a hassle for entities requesting authentication (e.g., resource providers). For example, in-person authentication processes may involve a representative having to visually check authentication information of users, such as comparing received authentication information with previously stored registration information, which is inefficient. To further exacerbate the issue, not all users may present the same type of authentication information and thus the representatives have to be able to manage different types of authentication information.

The above issues are apparent for situations in which a large number of consecutive in-person authentication processes are performed. For example, certain event organizers require that attendees provide authentication information in order to gain entry into an event. Typically, attendees may bring multiple pieces of information, such as an identification card along with a ticket with proof of payment. However, due to the issues described above, there is a delay during each in-person authentication process that is performed. As a result, the rate at which the entities are able to complete in-person authentication processes is low.

Some systems replace processes such as those described above with electronic systems to improve efficiency. For example, some systems utilize electronic ledgers to track information so that most of the processing can be performed digitally, which can reduce time and effort spent by users. However, such systems typically compromise security because they operate based on anonymity of end users and thus do not provide sufficient authentication processes. Thus, the electronic ledger may not be managed in a sufficiently secure manner.

Embodiments of the invention address this and other problems, individually and collectively.

BRIEF SUMMARY

One embodiment of the invention is related to a method that can be performed by a user device. The method may comprise determining data including an electronic identifier associated with the user, determining a key stored in a secure element of the user device, digitally signing the data using the key, determining a cryptogram, and providing the signed data and the cryptogram to a reader device, wherein the reader device may send a request to include the signed data in an electronic ledger upon verifying the cryptogram.

In some embodiments, the step of determining the cryptogram in the method performed by the user device may comprise some steps. For example, the user device may determine a session key based on at least an intermediary key and a counter value. The user device may then encrypt the data using the session key. In some implementations, the intermediary key may be a limited use key. In other implementations, the intermediary key may be a static key.

In some embodiments, the step of providing the signed data and the cryptogram to the reader device in the method performed by the user device may comprise some steps. For example, the user device may detect that the reader device is proximate. The user device then send the signed data and the cryptogram to the reader device over a short-range wireless connection.

Another embodiment of the invention is related to a method that can be performed by a reader device. The method may comprise receiving, from a user device, signed data and a cryptogram, wherein the signed data is determined by digitally signing data including an electronic identifier associated with the user using a key stored in a secure element of the user device. The method may further comprise determining whether the cryptogram can be verified, and upon verifying the cryptogram, sending a request to a remote server computer to include the signed data in an electronic ledger. In some embodiments, the cryptogram may be determined using a session key that is determined based on at least an intermediary key and a counter value. In some cases, the reader device may receive one or more dynamic values utilized to generate the session key from the user device.

In some embodiments, the step of verifying the cryptogram in the method performed by the reader device may comprise some steps. For example, the reader device may determine the session key and decrypt the cryptogram using the session to determine a first value. The reader device may device may also decrypt the signed data to determine a second value. The reader device may then determine that the first value and the second value match.

In some embodiments, the step of receiving the signed data and the cryptogram from the user device in the method performed by the reader device may comprise some steps. For example, the reader device may detect that the user device is proximate. The reader device may then receive the signed data and the cryptogram from the user device over a short-range wireless connection.

Embodiments of the invention are further directed to a user device comprising a processor and a memory element. The memory element can comprise code, executable by the processor, for implementing a method. The method may comprise determining data including an electronic identifier associated with the user, determining a key stored in a secure element of the user device, digitally signing the data using the key, determining a cryptogram, and providing the signed data and the cryptogram to a reader device, wherein the reader device may send a request to include the signed data in an electronic ledger upon verifying the cryptogram.

Another embodiment of invention is directed to a reader device comprising a processor and a computer readable medium coupled to the processor, the computer readable medium comprising code, executable by the processor for implementing a method. The method may comprise receiving, from a user device, signed data and a cryptogram, wherein the signed data is determined by digitally signing data including an electronic identifier associated with the user using a key stored in a secure element of the user device. The method may further comprise determining whether the cryptogram can be verified, and upon verifying the cryptogram, sending a request to a remote server computer to include the signed data in an electronic ledger.

These and other embodiments of the invention are described in further detail below.

DETAILED DESCRIPTION

Embodiments of the invention enable a distributed ledger system including a network of entities that maintain an electronic ledger that can keep track of information related to events (e.g., conducting a transaction, transmitting a message, etc.) performed by various entities in the network. An operating entity may manage access to the distributed ledger system. For example, the operating entity may allow certain entities to onboard with the distributed ledger system and give them the authority to update information in a ledger of the distributed ledger system. In some cases, these entities may be known as authorities, which may include resource providers, authorizing entities, processing entities, or other entities that are trusted by the operating entity. In some embodiments, other users may also utilize the distributed ledger system. For example, user devices operated by users may perform actions, such as conduct transactions, where information related to the actions can be sent to and verified by one or more authorities before being included in the electronic ledger.

Digital tracking of data is often utilized in place of in-person exchanges of information, such as in-person authentication processes. However, these substitute systems often bring about problems. For example, conventional uses of electronic ledgers are often risky because entities that can participate in managing information in the ledgers may not be authenticated properly. In some cases, this may result in malicious entities attempting to manipulate information that is stored in electronic ledgers, which can affect all users in the system. Embodiments of the invention provide an improved system in light of these issues.

Embodiments of the invention relate to a system that enables management of digital information to be more secure. For example, even though embodiments of the invention enable authentication processes to be performed digitally, the system implements a process in which each update in the ledgers of the distributed ledger system can be verified by one or more authorities that are explicitly allowed to update the ledger based on a series of cryptographic techniques. However, embodiments of the invention also provide efficient authentication processes, so that users and authorities can utilize the distributed ledger system in an intuitive manner.

Before discussing specific embodiments and examples, some descriptions of terms used herein are provided below.

Figure 6:
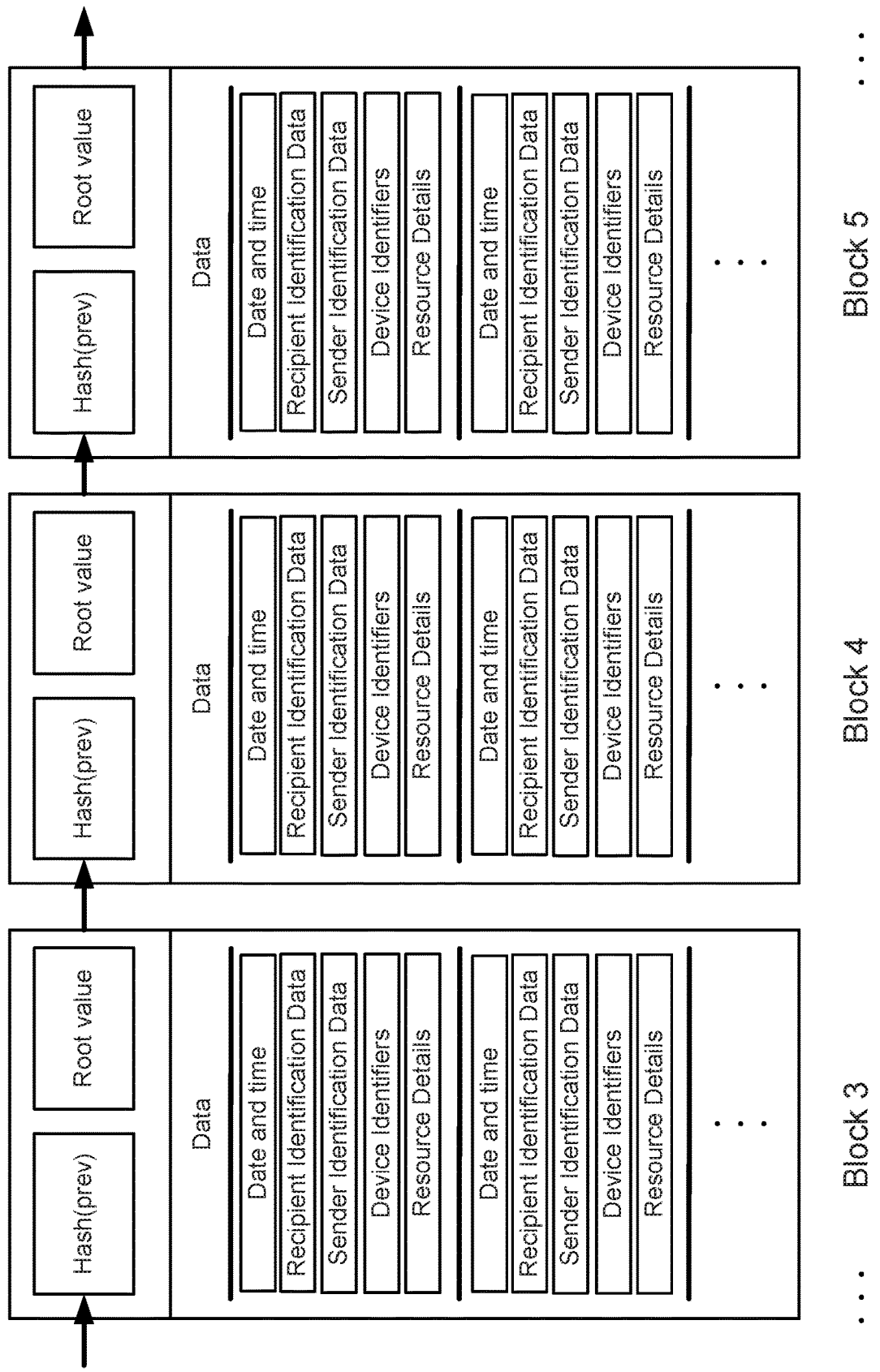
FIG. 6 shows an block diagram of an exemplary data structure according to embodiments of the present invention.

A "ledger" may refer to a compilation of data. The ledger may include entries with information related to events, messages, or transactions. The ledger may be a database or other comparable data structure that may be configured to store data from all previous entries. In some cases, each entry may include a timestamp of the corresponding event (e.g., conducting a transaction, performing an authentication process, transmission of a message, etc.), as well as information related to entities involved (e.g., the sender and the receiver). In some embodiments, the ledger may be in the form of an electronic ledger. For example, the ledger may be in the form of a blockchain in which data already stored in the electronic ledger is unalterable. In some embodiments, some or all entities within a system may store their own copy of the ledger. Exemplary entries in an electronic ledger are shown in FIG. 6.

A "digital signature" may refer to an electronic signature. In some embodiments, the digital signature may be used to validate the authenticity of information (e.g., message) sent within a system. A digital signature may be a unique value generated based on the information and a private key using an encrypting algorithm. In some embodiments, a verification algorithm using a public key may be used to verify the digital signature. The digital signature may be a numeric value, an alphanumeric value, or any other type of data including a graphical representation.

A "key" may refer to a piece of data or information used for an algorithm. A key may be a unique piece of data. In some cases, the key may be an asymmetric key that is typically part of a key pair, where a first key may be utilized to encrypt data and a second key may be utilized to decrypt the encrypted data. In other cases, the key may be a symmetric that can be utilized to encrypt data and also decrypt the encrypted data. The key may be a numeric or alphanumeric value and may be generated using an algorithm.

An "electronic identifier" may refer to a unique string of characters or symbols used to identify an individual. In preferred embodiments, the electronic identifier may be derived from information associated with a user. For example, in some embodiments, an electronic identifier may be a value calculated by hashing one or more input values (customer name, country code, etc.) available to multiple entities. In this way, the electronic identifier may be independently generated by any entity that has the prerequisite information. An electronic identifier may be altered (e.g., hashed and/or encrypted) information associated with a user. For example, in some embodiments, an electronic identifier may be derived from a combination of a country code, customer name, date of birth, and last four digits of a social security number such as SHA256(USA*JOHN SMITH*19700101*1234). Hashing this value may result in a seemingly random string of characters, such as 754WD2E2513BF546050C2D079FF5D65AB6E318E and this can be an electronic identifier. In some embodiments, the electronic identifier is associated with a passphrase that is provided in order to access any interaction record associated with the electronic identifier. An electronic identifier may sometimes be referred to as an "eID," electronic identity, or electronic identification data.

"Transaction data" (which may also be known as transaction information) may refer to any data or information surrounding or related to a transaction. For example, transaction data may include transaction details and any data associated with the transaction that may be utilized by entities involved in the transaction process. For instance, the transaction data may include information useful for processing and/or verifying the transaction. Transaction data may also include any data or information surrounding or related to any participants partaking in or associated with the transaction. Example transaction data may include a transaction amount, transaction location, resources received (e.g., products, documents, etc.), information about the resources received (e.g., size, amount, type, etc.), resource providing entity data (e.g., merchant data, document owner data, etc.), user data, date and time of a transaction, payment method, and other relevant information.

A "resource providing entity" may be an entity that may make resources available to a user. Resource providing entities may also be known as resource providers. Examples of resource providing entities include merchants, vendors, suppliers, owners, traders, wallet providers, service providers, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., e-commerce websites, online companies, etc.). In some embodiments, resource providing entities may make available resources that are physical items (e.g., goods, products, etc.) to the user. In other embodiments, resource providing entities may make available digital resources (e.g., electronic documents, electronic files, etc.) or services (e.g., digital wallet services) to the user. In some embodiments, resource providing entities may manage access to certain resources by the user.

An "authorization computer" can include any system enabling an authorization process. The authorization computer may determine whether a transaction can be authorized and may generate an authorization response message including an authorization status (also may be known as an authorization decision). In some embodiments, an authorization computer may be an issuer computer that issues accounts (e.g., payment accounts) and corresponding account information to users. In some cases, the authorization computer may store contact information of one or more users.

A "server computer" can be a powerful computer or a cluster of computers. For example, the server computer can be a large mainframe, a minicomputer cluster, or a group of servers functioning as a unit. In one example, the server computer may be a database server coupled to a Web server.

Figure 1:
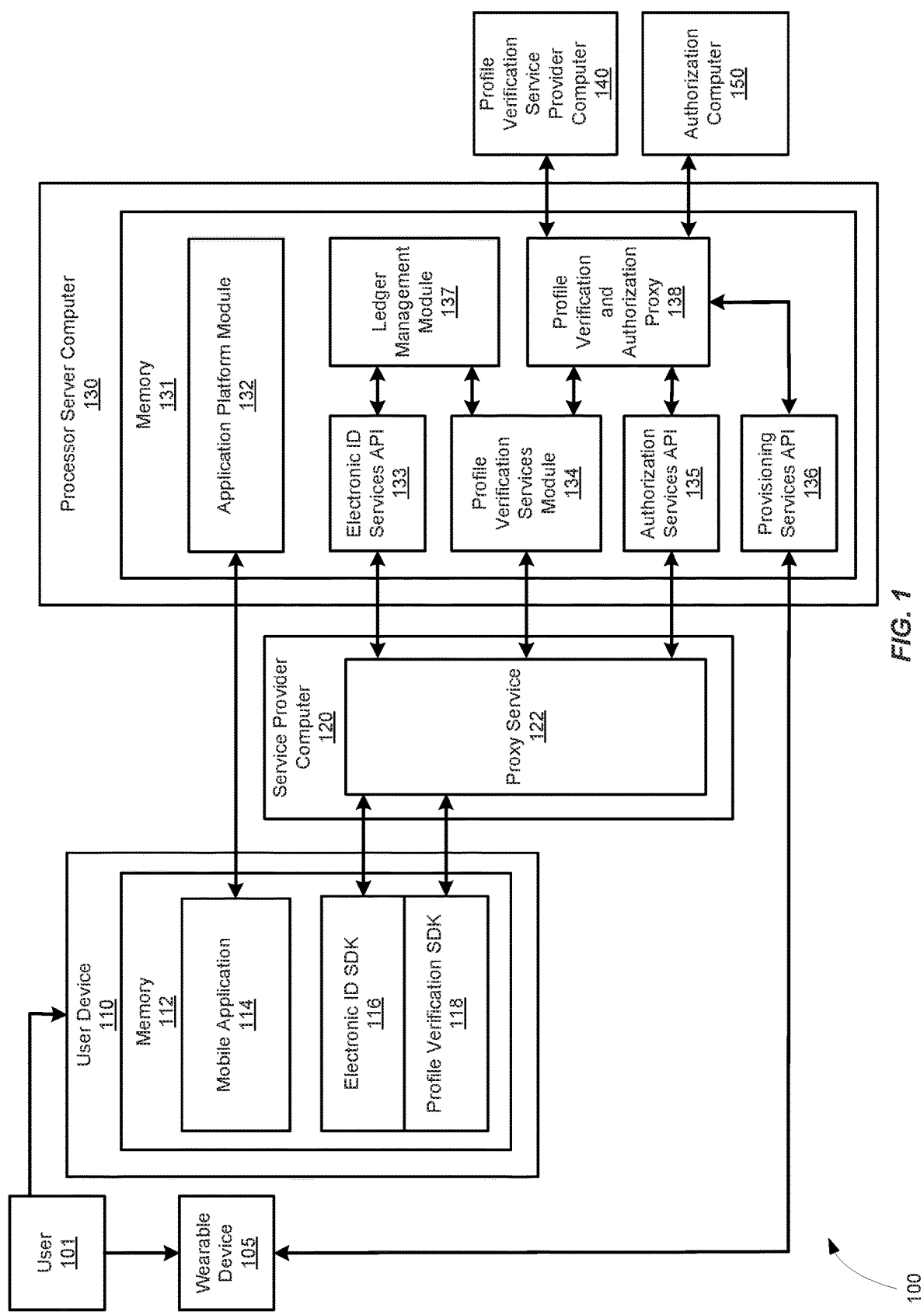
FIG. 1 shows a block diagram showing various elements of an exemplary system according to embodiments of the present invention.

FIG. 1 illustrates an exemplary system 100 with at least some of the components for implementing embodiments of the invention. System 100 may enable entities to perform a registration process in which various information can be transferred amongst entities to enable user 101 to onboard with the distributed ledger system according to embodiments of the invention.

FIG. 1 includes user 101 operating a user device 110, which may be in communication with a service provider computer 120 and a processor server computer 130. The processor server computer 130 may be in communication with a profile verification service provider computer 140 and an authorization computer 150. In some embodiments, user 101 may also operate a wearable device 105. The computing devices (e.g., user device 110, wearable device 105, service provider computer 120, processor server computer 130, profile verification service provider computer 140, authorization computer 150) in FIG. 1 may be in communication with each other via any suitable communications networks. Further, any of the computing devices (e.g., user device 110, wearable device 105, service provider computer 120, processor server computer 130, profile verification service provider computer 140, authorization computer 150) may include a processor and a computer readable medium comprising code, executable by the processor for performing the functionality described herein.

User 101 may be an entity operating user device 110. User 101 may be an individual or an entity represented by a group of individuals (e.g., corporation, etc.). User 101 may be able to input information into user device 110, such as through a user interface provided by a mobile application 114.

User device 110 may be any suitable computing device. User device 110 may include a memory 112 that may store mobile application 114, as well as various software development kits (SDKs), such as an electronic identifier SDK 116 and a profile verification SDK 118. User device 110 may include a network interface and may be capable of communicating over a communications network with one or more entities, including service provider computer 120 and processor server computer 130. User device 110 may be capable of remote communication with a remote entity. In some embodiments, user device 110 may also be capable of short-range communication through contact or contactless methods (e.g., NFC, Wi-Fi, Bluetooth, etc.). Some non-limiting examples of user device 110 may include mobile devices (e.g., cellular phones, keychain devices, personal digital assistants (PDAs), pagers, notebooks, laptops, notepads, smart watches, fitness bands, jewelry, etc.), automobiles with remote communication capabilities, personal computers, cards (e.g., smart cards, magnetic stripe cards, etc.), and the like.

Wearable device 105 may be any suitable computing device. Wearable device 105 may include a memory that can store information. Wearable device 105 may be portable and be able to be worn by user 101. Typically, wearable device 105 may be capable of short-range communication through contact or contactless methods (e.g., NFC, Wi-Fi, Bluetooth, etc.) with an access device. In some embodiments, wearable device 105 may be in communication with another device, such as user device 110, over a wireless network. Thus, wearable device 105 may be capable of operating online (e.g., connected to a wireless network) or offline (e.g., not connected to a wireless network).

Mobile application 114 may provide a service accessible by user device 110. Mobile application 114 may be operated by processor server computer 130. Mobile application 114 may be able to receive information input into user device 110 by user 101 and transmit it to other entities, such as service provider computer 120 or processor server computer 130. In some embodiments, mobile application 114 may be developed using electronic identifier SDK 116 and profile verification SDK 118.

Electronic identifier SDK 116 may include software tools, libraries, and documentation that enable generation and utilization of electronic identifiers. Electronic identifier SDK 116 may enable issuance of a different electronic identifier for each user. For example, electronic identifier SDK may be utilized by mobile application 114 to request issuance of an electronic identifier unique to user 101. Electronic identifier SDK may enable this functionality in conjunction with an electronic identifier services API 133 hosted by processor server computer 130.

An electronic identifier may be information unique to a user. An electronic identifier may be generated based on multiple pieces of information associated with the user (e.g., phone number, social security number, date of birth, citizenship, email address, biometric information, etc.) and may be in an obfuscated form (e.g., encrypted), so that the electronic identifier on its own does not reveal any sensitive information about the user. Typically, the electronic identifier may be a string made up of a combination of numeric, alphanumeric, or other characters.

Profile verification SDK 118 may include software tools, libraries, and documentation that enable verification of profile information associated with users. For example, profile verification SDK may enable requests for identification and verification of the identity of users. In some cases, in order to verify a user, profile verification SDK may request checking of various information associated with the user, such as their identity documentation, historical behavior information, background checks, risk analysis, and other relevant information. Profile verification SDK 118 may enable this functionality in conjunction with a profile verification services module 134 hosted by processor server computer 130, which may be in communication with a profile verification service provider computer 140. In some embodiments, profile verification SDK 118 may enable a "know your customer" or "KYC" process.

Service provider computer 120 may be a server computer that can send and receive information between user device 110 and processor server computer 130. Service provider computer 120 may comprise a proxy service 122 for routing information between user device 110 and processor server computer 130. For example, proxy service 122 may route messages between electronic identifier SDK and electronic identifier services API 133, as well as between profile verification SDK 118 and profile verification services module 134. Proxy service 122 may also handle messages from authorization services API 135.

Processor server computer 130 may include data processing subsystems, networks, and operations. Processor server computer 130 may route information between entities, such as service provider computer 120, profile verification service provider computer 140, and authorization computer 150. In some cases, processor server computer 130 may be utilized to support and deliver authorization services, as well as clearing and settlement services. In some embodiments, processor server computer 130 may be associated with a payment processing network (e.g., VisaNet® operated by Visa®), which may include wired or wireless network, including the Internet.

Processor server computer 130 may include various modules and APIs. These modules and APIs may be stored in memory 131 of processor server computer 130. Memory 131 may store an application platform module 132, an electronic identifier services API 133, a profile verification services module 134, an authorization service API 135, a provisioning services API 136, a ledger management module 137, and a profile verification and authorization proxy 138. Each module may comprise one or more functions implemented by code, executable by a data processor of processor server computer 130. Application platform module 132 may provide software tools and services for the development, assembly, testing, deployment, and management of mobile application 114.

Other modules and submodules not shown in FIG. 1 may also reside on memory 131. Examples of additional modules may include a module for processing and routing messages, a clearing and settlement module for processing and routing clearing messages and performing settlement between parties, and data extraction modules (e.g., for retrieving data from external data sources such as databases), storage modules, and message modification modules. Each module residing on memory 131 may be combined with any of the additional modules as appropriate. Any of the modules may comprise one or submodules, where each submodule may comprise one or more functions implemented by code, executable by a data processor of processor server computer 130.

In some embodiments, processor server computer 130 may also be in communication with several databases. The databases may include contact information associated with users, historical transaction or behavior information associated with users, or any other information that may be collected by processor server computer 130 over time. Each database may be a conventional, fault tolerant, relational, scalable, secure database such as those commercially available from Oracle™ or Sybase™. In some embodiments, any of the databases may be combined into a single database, or may be separated into multiple databases.

Electronic identifier services API 133 may enable, in conjunction with the data processor of processor server computer 130, generation and utilization of electronic identifiers. Electronic identifier services API 133 may enable, with the data processor, issuance of a different electronic identifier for a user in response to a request for generation of an electronic identifier. For example, electronic identifier services API 133 issue, using the data processor, an electronic identifier unique to user 101 upon request for generation of an electronic identifier from mobile application 114.

Profile verification services module 134 may enable, in conjunction with the data processor of processor server computer 130, verification of profile information associated with users. Profile verification services module 134 may enable, with the data processor, identification and verification of the identity of users upon request for verification or profile information. For example, profile verification services module 134 may perform, using the data processor, the verification process in response to a request from mobile application 114. In some cases, in order to verify profile information of a user, profile verification services module 134 may perform, with the data processor, checking of various information associated with the user, such as their identity documentation, historical behavior information, background checks, risk analyses, and other relevant information. Profile verification services module 134 may enable this functionality by communicating with profile verification service provider computer 140, which may store some or all of the information associated with the user that is to be verified. In some embodiments, profile verification services module 134 may forward, using the data processor, a received request for verification to profile verification service provider computer 140 with information regarding how the verification processes should be conducted.

Authorization services API 135 may enable, in conjunction with the data processor of processor server computer 130, authorization processes. In some embodiments, authorization services API 135 may enable, with the data processor, transmission of requests to authorization computer 150 to perform certain authorization processes. For example, authorization services API 135 may enable, with the data processor, transmission of requests to authorization computer 150 to authorize activation of an account along with issuance of account information associated with certain users.

Profile verification and authorization proxy 138 may route information between processor server computer 130 and other entities. For example, profile verification and authorization proxy 138 may route messages between profile verification services module 134 and profile verification service provider computer 140, as well as between authorization services API 135 and authorization computer 150. Profile verification and authorization proxy 138 may also handle messages from provisioning services API 136.

Ledger management module 137 may enable, in conjunction with the data processor of processor server computer 130, management of a distributed ledger system. Ledger management module 137 may manage, with the data processor, information stored in an electronic ledger that is accessible through a ledger management network. Ledger management module 137 may only allow, with the data processor, authorities to access the ledger management network. For example, ledger management module 137 may perform, with the data processor, onboarding processes for authorities so that they can be allowed to connect to the network and request to update information in the ledger. In some cases, ledger management module 137 may perform, with the data processor, onboarding processes by enabling authorities to exchange, over the network, their account addresses (e.g., hash of public keys) for updating the ledger and other information (e.g., contracts) to ensure their authorized status. In some embodiments, each authority may store their own copy of the ledger.

Ledger management module 137 may also perform, with the data processor, registration processes (e.g., electronic identifier generation and verification processes, user profile information verification processes, etc.) for users that want to connect to the ledger management network to store information related to actions (e.g., requests for access, transmission of message, conduct transaction, etc.) that they perform with their user devices. Accordingly, ledger management module 137 may manage, with the data processor, communications received through the ledger management network to which various entities in the system may send requests regarding the electronic ledger. Ledger management module 137 may also enable, with the data processor, interfacing with various proxies and APIs in order to communicate with various entities in the distributed ledger system.

Profile verification service provider computer 140 may be a server computer that enables verification of profile information associated with users. In some embodiments, profile verification service provider computer 140 may receive a request from profile verification and authorization proxy 138 to verify profile information. In some cases, profile verification service provider computer 140 may also receive information regarding how the verification processes should be conducted. Profile verification service provider computer 140 may perform checking of various information associated with a user, such as their identity documentation, historical behavior information, background checks, risk analysis, and other relevant information. Profile verification service provider computer 140 may store some or all of the information to be verified.

Authorization computer 150 is typically a computer run by an entity (e.g., a bank) that may provide authorization services. Authorization computer 150 may communicate with processor server computer 130 to enable the authorization services, such as through function calls by authorization services API 135. In some embodiments, authorization computer 150 may be able to issue account information (e.g., account identifier, etc.) for a user based on verification of their profile information as performed by profile verification service provider computer 140. In some embodiments, authorization computer 150 may also be known as an issuer computer.

A registration process is described with respect to components of system 100. Initially, user 101 may initiate the authentication process by inputting information into user device 110. For example, user 101 may input a request to conduct the registration process into a user interface provided by mobile application 114. Upon being prompted for user information to be utilized for the registration process, user 101 may input their user information into mobile application 114. User information may include any suitable information associated with user 101 that may identify user 101 (e.g., name, address, phone number, social security number, date of birth, citizenship, biometric information, etc.). In some embodiments some or all of the user information may be utilized by electronic identifier SDK 116 or profile verification SDK 118.

Upon input of the request to conduct the registration process, electronic identifier SDK 116 may generate and send a request for an electronic identifier for user 101. The request may be received by proxy service 122, which may then forward the request to electronic identifier services API 133. The request may be sent along with the user information to be utilized for generation of the electronic identifier. Electronic identifier services API 133 may then generate the electronic identifier. As described above, the electronic identifier may be information unique to a user. The electronic identifier may be generated based on some of all of the user information input by user 101. In some cases, the electronic identifier may be in obfuscated form (e.g., encrypted), so that the electronic identifier on its own does not reveal any sensitive information about the user. Typically, the electronic identifier may be a string made up of a combination of numeric, alphanumeric, or other characters.

After generation of the electronic identifier, electronic identifier services API 133 may send information to ledger management module 137 indicating that the electronic identifier associated with user 101 has been generated. The information may include the electronic identifier along with other information related to the electronic identifier, such as a date and time of generation of the electronic identifier. Ledger management module 137 may update a ledger to include information indicating that the electronic identifier has been issued to user 101. In some cases, ledger management module 137 may associate this information with an account address (e.g., public key) of user 101. Thus, a record may be created in the ledger that the electronic identifier was issued to user 101. A confirmation that the electronic identifier has been generated can be sent back to mobile application 114 along with the electronic identifier. Mobile application 114 may store the received electronic identifier.

Additionally, upon input of the request to conduct the registration process, profile verification SDK 118 may generate and send a request for verification of profile information associated with user 101. The request may be received by proxy service 122, which may then forward the request to profile verification services module 134. Profile verification services module 134 may then process the request and forward the request (e.g., along with additional information specifying conditions for the verification process), to profile verification and authorization proxy 138, which may then communicate the request to profile verification service provider computer 140 to verify profile information associated with user 101. As described above, in some cases, verifying profile information of a user may comprise checking of various information associated with the user, such as their identity documentation, historical behavior information, background checks, risk analysis, and other relevant information. Profile verification service provider computer 140 may determine a verification result and send the verification result to profile verification and authorization proxy 138, which may then forward the verification result to profile verification services module 134.

If the verification result indicates that the profile information of user 101 was verified, profile verification services module 134 may generate a certificate indicating the positive verification result. In some embodiments, the certificate may be a digital certificate that can include a digital signature of processor server computer 130 or profile verification service provider computer 140. A confirmation that the profile information of user 101 has been generated can be sent back to mobile application 114 along with the certificate. Mobile application 114 may store the received certificate.

Additionally, profile verification services module 134 may send information to ledger management module 137 indicating that the profile information associated with user 101 has been verified. The information may include the generated certificate along with other information related to the certificate, such as a date and time of generation of the certificate. Ledger management module 137 may update a ledger to include information indicating verification of the profile information of user 101. In some cases, ledger management module 137 may associate this information with an account address (e.g., public key) of user 101. Thus, a record may be created in the ledger that the certificate was issued to user 101.

In some embodiments, an account may be issued to user 101 during the registration process. Authorization computer 150 may be requested to issue the account. In some cases, information indicating that user 101 is authenticated may be sent to authorization computer 150 before issuance of the account. For example, authorization services API 135 may send some or all of the user information input by user 101 into mobile application 114 along with information indicating that profile information of user 101 was verified, such as the generated certificate, to authorization computer 150 via profile verification and authorization proxy 138. Authorization computer 150 may then issue the account for user 101 and generate corresponding account information (e.g., account identifier, etc.). Authorization computer 150 may send the account information to authorization services API 135 via profile verification and authorization proxy 138. The account information may be sent to mobile application 114, which may then store the account information.

In some embodiments, user 101 may also operate wearable device 105. In this case, provisioning services API 136 may provision information to wearable device 105. For example, profile verification and authorization proxy 138 may send the information to be provisioned, such as electronic identifier and account identifier, to provisioning services API 136, which may then provision the received information to wearable device 105. This may activate wearable device 105 for use in the distributed ledger system according to embodiments of the invention.

Figure 2:
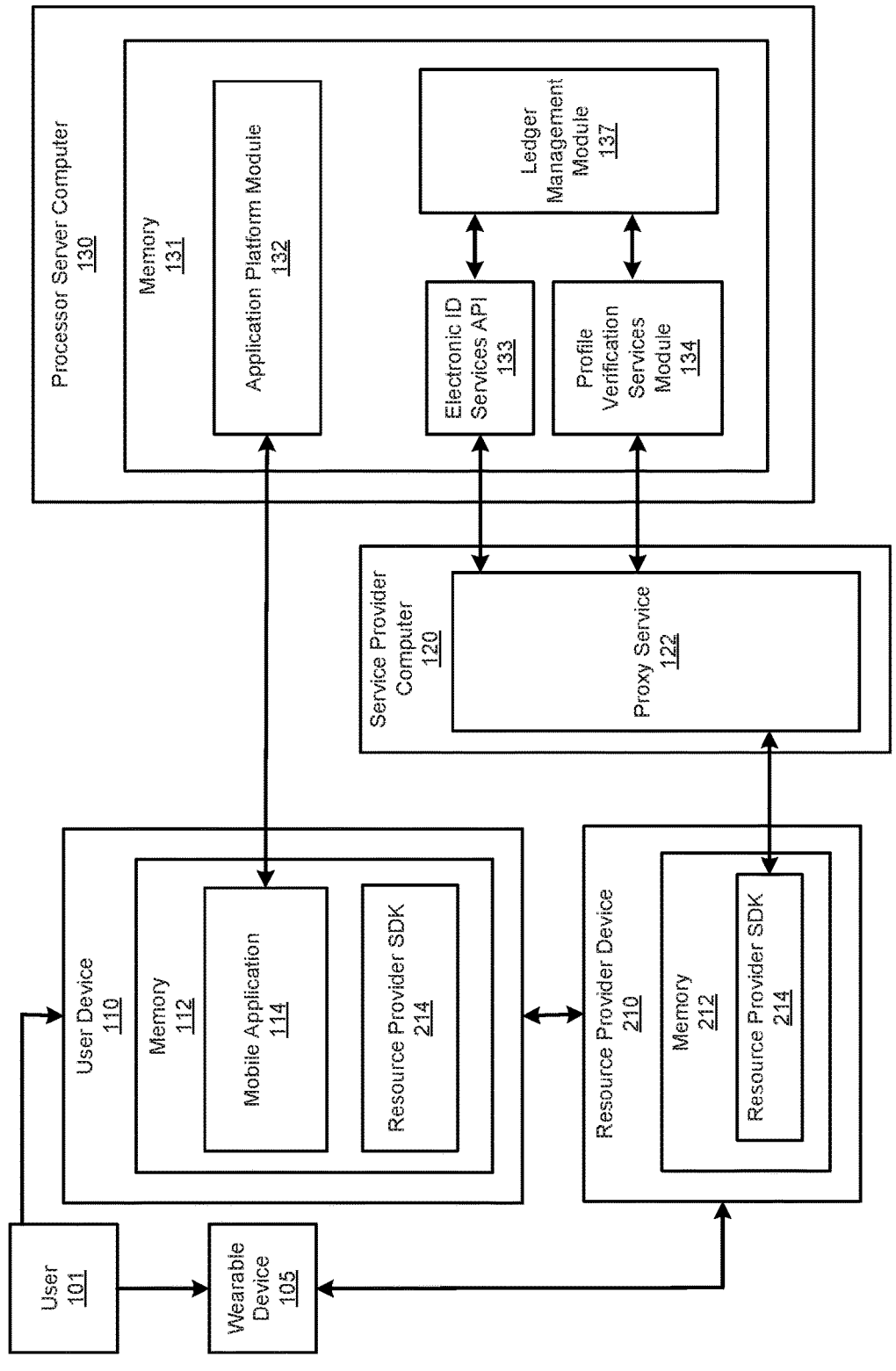
FIG. 2 shows a block diagram showing various elements of an exemplary system according to embodiments of the present invention.

FIG. 2 illustrates an exemplary system 200 with at least some of the components for implementing embodiments of the invention. System 200 may enable entities to utilize information issued during the registration process as described with respect to FIG. 1 with the distributed ledger system according to embodiments of the invention. Multiple components shown in FIG. 2 are the same as those in FIG. 1 and thus are not described in detail for brevity.

FIG. 2 includes user 101 operating a user device 110, which may be in communication with resource provider device 210, service provider computer 120, and processor server computer 130. User 101 may a resource provider SDK 214 in memory 112. In some embodiments, user 101 may also operate a wearable device 105. The computing devices (e.g., user device 110, wearable device 105, service provider computer 120, processor server computer 130, resource provider device 210) in FIG. 2 may be in communication with each other via any suitable communications networks. Further, any of the computing devices (e.g., user device 110, wearable device 105, service provider computer 120, processor server computer 130, resource provider device 210) may include a processor and a computer readable medium comprising code, executable by the processor for performing the functionality described herein.

Resource provider device 210 may be a computing device associated with a resource provider. Resource provider device 210 may include a memory 212 that may store resource provider SDK 214. Resource provider device 210 may be configured to process data associated with requests for access to a resource. Resource provider device 210 may engage in transactions or provide access to resources (e.g., goods, services, etc.) to consumers (e.g., user 101). In some embodiments, resource provider device 106 may accept requests for access to a resource via a website or application. In some embodiments, resource provider device 210 may be associated with a physical store that utilizes an access device for accepting in-person requests for access to a resource. Further, in some embodiments, resource provider device 210 may be an access device (e.g., terminal device, mobile point-of-sale device, etc.) associated with the resource provider and that may be in communication with a resource provider computer.

Resource provider SDK 214 may include software tools, libraries, and documentation that enable user device 110 and resource provider device 210 to communicate information so that user 101 can request the resource provider for access to a resource. For example, resource provider SDK 214 may enable transmission of information (e.g., electronic identifier, certificate, etc.) stored by mobile application 114 to resource provider device 210. Further, resource provider SDK may enable resource provider device 210 to request verification of information received from user device 110.

A process for utilizing information issued during the registration process is described with respect to components of system 200. Initially, user 101 may present user device 110 or wearable device 105 to resource provider device 210. In an exemplary case, resource provider device 210 may be an access device (e.g., mobile device) associated with the resource provider that can be utilized for an in-person authentication process. In some cases, the authentication process may be utilized by user 101 to request access to an event at a physical location. User 101 may bring user device 110 or wearable device 105 in proximity with resource provider device 210. Resource provider device 210 may detect that user device 110 or wearable device 105 is proximate and then may receive information over a short-range wireless communication (e.g., NFC, Wi-Fi, Bluetooth, etc.) from user device 110.

Resource provider device 210 may then generate and send a request to verify the received information. In some cases, the received information may include the electronic identifier associated with user 101 and the certificate indicating verification of profile information of user 101 received during the registration process. The request may be sent with the electronic identifier to electronic identifier services API 133 via proxy service 122. Additionally, the request may be sent with the certificate to profile verification services module 134 via proxy service 122.

Electronic identifier services API 133 may communicate with ledger management module 137 to determine whether the received electronic identifier can be verified. For example, electronic identifier services API 133 may request ledger management module 137 to determine whether the electronic ledger includes a record of information indicating the electronic identifier was issued to user 101. In some cases, the request may indicate the public account address (e.g., hashed public key) of user 101 that is associated with the records stored in the electronic ledger corresponding to user 101. In response, ledger management module 137 may perform a search (e.g., lookup function) to determine the records associated with user 101 based on the public account address of user 101 and then determine whether any of the retrieved records indicates that the electronic identifier received from user device 110 was issued to user 101. For example, ledger management module 137 may determine that the electronic identifier is valid by verifying one or more digital signatures stored in a record that indicates issuance of the electronic identifier. The one or more digital signatures may be included by one or more authorized entities (e.g., processor server computer, authorization computer, etc.) that handled issuance of the electronic identifier. If it is determined that the electronic identifier was issued to user 101, then a confirmation response may be sent to electronic identifier services API 133, which may then send a confirmation to resource provider device 210 via proxy service 122.

Additionally, profile verification service module 134 may communicate with ledger management module 137 to determine whether the received certificate can be verified. For example, profile verification service module 134 may request ledger management module 137 to determine whether the ledger includes a record of information indicating the certificate was issued to user 101. In some cases, the request may indicate the public account address (e.g., hashed public key) of user 101 that is associated with the records stored in the electronic ledger corresponding to user 101. In response, ledger management module 137 may perform a search (e.g., lookup function) to determine the records associated with user 101 based on the public account address of user 101 and then determine whether any of the retrieved records indicates that the certificate received from user device 110 was issued to user 101. For example, ledger management module 137 may determine that the certificate is valid by verifying one or more digital signatures stored in a record that indicates issuance of the certificate. The one or more digital signatures may be included by one or more authorized entities (e.g., processor server computer, authorization computer, etc.) that handled the profile verification process. If it is determined that the certificate was issued to user 101, then a confirmation response may be sent to profile verification service module 134, which may then send a confirmation to resource provider device 210 via proxy service 122.

Subsequently, resource provider device 210 may recognize that user 101 is authenticated. Resource provider device 210 may then allow the user access to the resource, which in this case may be access to an event at a physical location.

While FIG. 1 and FIG. 2 show exemplary systems, it is understood that embodiments are not so limited. For example, while FIG. 1 and FIG. 2 show a single user device 110, a single resource provider device 210, and a single authorization computer 150, the system may actually include multiple user devices, resource provider devices, and authorization computers that are in communication with each other, as well as in communication with service provider computer 120 and processor server computer 130.

The communications network by which any of the computing devices in FIG. 1 and FIG. 2 may be in communication with each other may comprise a plurality of networks for secure communication of data and information between entities. In some embodiments, the communications network may follow a suitable communication protocol to generate one or more secure communication channels. A communication channel may in some instances comprise a "secure communication channel," which may be established in any known manner, including the use of mutual authentication and a session key and establishment of an SSL session. However, any method of creating a secure channel may be used. By establishing a secure channel, sensitive information related to user 101 may be securely transmitted.

Any suitable communications protocol may be used for generating a communications channel. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 3:
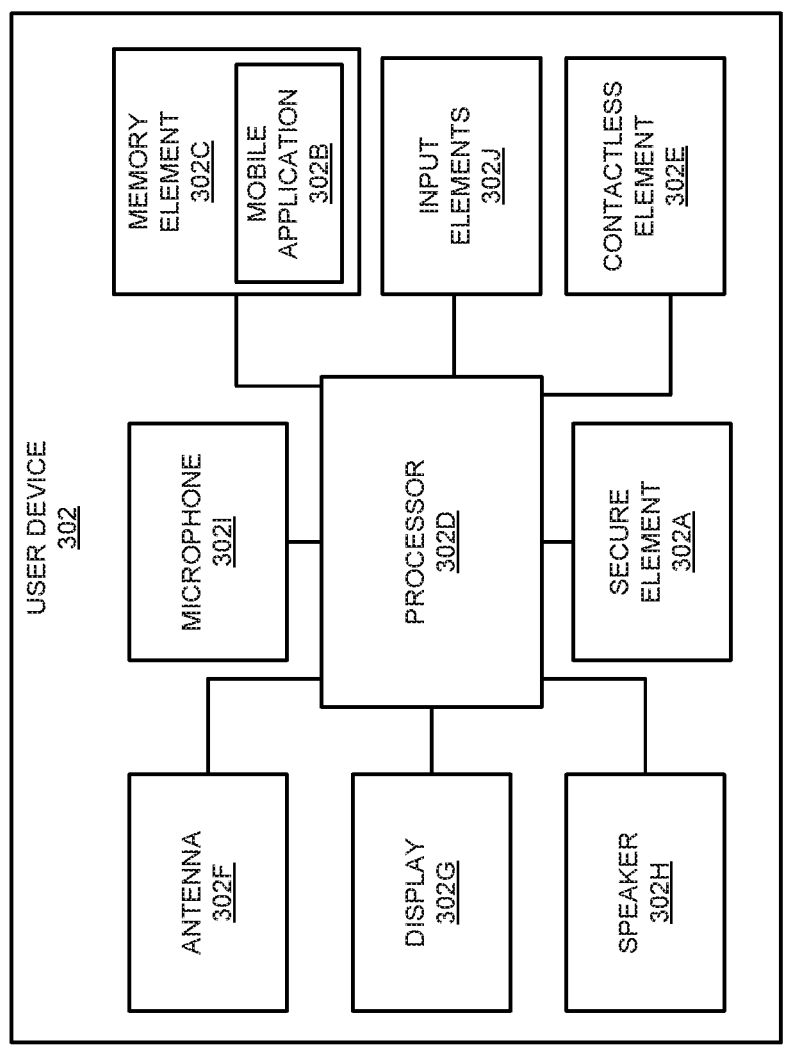
FIG. 3 shows a block diagram showing various elements of a user device according to embodiments of the present invention.

FIG. 3 depicts a block diagram of an exemplary user device 302. FIG. 3 shows a number of components, and user device 302 according to embodiments of the invention may comprise any suitable combination or subset of such components.

User device 302 may include a processor 302D (e.g., a microprocessor) for processing functions of user device 302. One exemplary function enabled by processor 302D includes processing functions of display 302G to allow a user to see information (e.g., interfaces, contact information, messages, etc.). Processor 302D may include hardware within user device 302 that can carry out instructions embodied as code in a computer-readable medium.

An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

User device 302 may comprise a secure element 302A. Secure element 302A may be a secure memory on user device 302 such that the data contained on secure element 302A cannot easily be hacked, cracked, or obtained by an unauthorized entity. Secure element 302A may be utilized by user device 302 to host and store data and applications that may require a high degree of security. Secure element 302A may be provided to user device 302 by a secure element issuer. Secure element 302A may be either embedded in the handset of user device 302 or in a subscriber identity module (SIM) card that may be removable from user device 302. Secure element 302A can also be included in an add-on device such as a micro-Secure Digital (micro-SD) card or other portable storage device.

Secure element 302A may store any suitable sensitive information. For example, secure element 302A may store access data (e.g., account information, token information, etc.) associated with a user. Other information that may be stored in secure element 302A may include user information or user data (e.g., name, date of birth, contact information, etc.). In other embodiments, some, none, or all of the foregoing information may be stored in memory element 302C or may be stored at a remote server computer (e.g., in the cloud).

User device 302 may comprise a memory element 302C (e.g., computer readable medium). Memory element 302C may be present within a body of user device 302 or may be detachable from the body of user device 302. The body of user device 302 may be in the form of a plastic substrate, housing, or other structure. Memory element 302C may store data (e.g., applications, etc.) and may be in any suitable form (e.g., a magnetic stripe, a memory chip, etc.).

Memory element 302C may comprise a mobile application 302B. Mobile application 302B may be computer code or other data stored on a computer readable medium (e.g. memory element 302C or secure element 302A) that may be executable by processor 302D to complete a task (e.g., provide a service). Mobile application 302B may be an application that operates on user device 302 and that may provide a user interface for user interaction (e.g., to enter and view information).

In some embodiments, mobile application 302B may be a service provider application. Mobile application 302B may communicate with a service provider computer to retrieve and return information during processing of any of a number of services offered to the user via user device 302 (e.g., providing access to a resource).

User device 302 may further include a contactless element 302E, which may typically be implemented in the form of a semiconductor chip (or other data storage element) with an associated wireless transfer (e.g., data transmission) element, such as an antenna 302F. Contactless element 302E may be associated with (e.g., embedded within) user device 302. Data or control instructions transmitted via a cellular network may be applied to contactless element 302E by means of a contactless element interface (not shown). In some cases, the contactless element interface may function to permit the exchange of data and/or control instructions between the user device circuitry (and hence the cellular network) and an optional contactless element 302E.

Contactless element 302E may be capable of transferring and receiving data using a near-field communications (NFC) capability (or NFC medium) typically in accordance with a standardized protocol or data transfer mechanism (e.g., ISO 14443/NFC). User device 302 may support contactless transactions using the EMV contactless communication protocol (EMV-CCP), which is based on ISO 14443, in order to interact with access devices. This capability may typically be met by implementing NFC. The NFC capability of user device 302 may be enabled by an embedded NFC chip or by the addition of an external memory card or accessory that contains the NFC chip. NFC capability is a short-range communications capability, such as RFID, Bluetooth®, infra-red, or other data transfer capability that can be used to exchange data between the user device 302 and an interrogation device. Thus, user device 302 may be capable of communicating and transferring data and/or control instructions via both cellular network and near-field communications capability.

User device 302 may further include an antenna 302F for wireless data transfer (e.g., data transmission). Antenna 302F may be utilized by user device 302 to send and receive wireless communications. Antenna 302F may assist in connectivity to the Internet or other communications networks and enable data transfer functions. Antenna 302F may enable SMS, USSD, as well as other types of cellular communications, such as voice call and data communications.

User device 302 may include a display 302G that may show information to a user. Display 302G may be any suitable screen that enables touch functionality. In some embodiments, display 302G of user device 302 may display a user interface (e.g., of a mobile application or website) that may allow the user to select and interact with objects presented on display 302G. The objects may include, but may not be limited to, menus, text fields, icons, and keys/ inputs on a virtual keyboard.

User device 302 may include a speaker 302H, which may be any suitable device that can produce sound in response to an electrical audio signal. Speaker 302H may play recorded sounds, as well as prerecorded messages to communicate with a user. In some cases, the user may be able to receive instructions by voice communications played by speaker 302H to which the user may respond (e.g., by returning voice command, activating input elements, etc.).

User device 302 may include a microphone 302I, which may be any suitable device that can convert sound to an electrical signal. Microphone 302I may be utilized to capture one or more voice segments from a user. For example, microphone 302I may allow the user to transmit his or her voice to user device 302. In some embodiments, the user may utilize voice commands detected by microphone 302I to provide instructions to user device 302. In some cases, the user may provide voice commands detected by microphone 302I to navigate through mobile application 302B.

User device 302 may further include input elements 302J to allow a user to input information into the device. Example input elements 302J include hardware and software buttons, audio detection devices (e.g., microphone), biometric readers, touch screens, and the like. A user may activate one or more of input elements 302J, which may pass user information to user device 302. In some cases, one or more of input elements 302J may be utilized to navigate through various screens of mobile application 302B.

In some embodiments, where user device 302 is a phone or other similar computing device, user device 302 may include a browser stored in the memory element 302C and may be configured to retrieve, present, and send data across a communications network (e.g., the Internet). In such embodiments, user device 302 may be configured to send data as part of a transaction. In some embodiments, user device 302 may provide the data upon request from another entity (e.g., access device).

Figure 4:
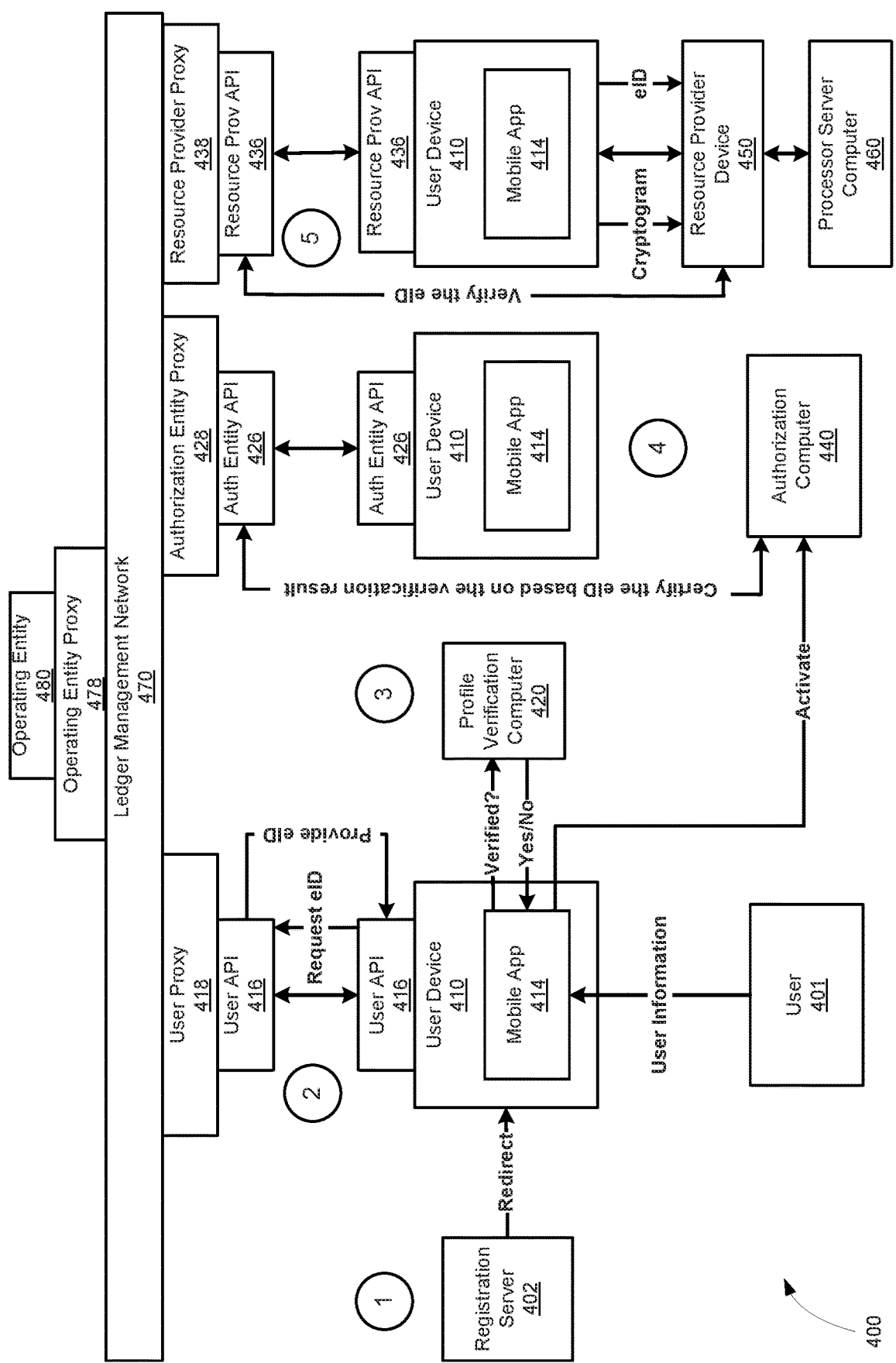
FIG. 4 shows a flow diagram of an exemplary process according to embodiments of the present invention.

FIG. 4 depicts an exemplary flow diagram 400 according to embodiments of the invention. FIG. 4 shows an overall flow involving a single user device 410 from registration to utilization of information issued during registration.

FIG. 4 includes a ledger management network 470, which may be a network that can be utilized to manage information in a distributed ledger system. In some embodiments, various entities, including users (e.g., user 401), authorities (e.g., resource provider associated with resource provider device 450, authorization entity associated with authorization computer 440, etc.), and an operating entity 480 may connect to ledger management network 470 to manage information associated with an electronic ledger hosted by ledger management network 470. In some embodiments, each authority may store their own copy of the electronic ledger. Any of the entities may communicate with ledger management network 470 through a proxy service. In some embodiments, the proxy service may be operated by one or more intermediary computing devices (not shown) that may be able to route information between entities.

It is understood that entities in the system may perform onboarding processes so that they can communicate with ledger management network 470. For example, each entity may have their own public and private key pair that they can utilize to generate digital signatures or decrypt information. In addition, ledger management network 470 may issue a different public and private key pair for each entity for use with the electronic ledger. For example, the public key of a key pair issued by ledger management network 470 for an entity may be utilized to generate a public account address (e.g., hashed public key) for the entity. The public account address may be utilized by ledger management network 470 to associate any information entered into the electronic ledger by the entity with the entity.

In some embodiments, operating entity 480 may manage communications received by ledger management network 470. Operating entity 480 may also handle the enrollment of authorized entities that can update the electronic ledger, management of key distribution and utilization by entities in the system, and management of trust amongst entities utilizing ledger management network 470. In some implementations, operating entity 480 may be an entity that enables functionalities similar to those described with respect to ledger management module 137 of FIG. 1 and FIG. 2. Thus, in an exemplary case, operating entity 480 may be processor server computer 460. Communications to operating entity 480 may be communicated through operating entity proxy 478.

Some components shown in FIG. 4 may have similar functionalities to those described with respect to FIGS. 1-3 and thus detailed descriptions about these components are not repeated for brevity. For example, user 401 may include similar features to those of user 101 of FIGS. 1-2, user device 410 may include similar features to those of user device 110 in FIG. 1-2 as well as user device 302 in FIG. 3, mobile application 414 may include similar features to those of mobile application 114 of FIGS. 1-2 and mobile application 302B of FIG. 3, profile verification computer 420 may include similar features to profile verification service provider computer 140 of FIG. 1, authorization computer 440 include similar features to those of authorization computer 150 of FIG. 1, resource provider device 450 may include similar features to those of resource provider device 210 of FIG. 2, and processor server computer 460 may include similar features to those of processor server computer 130 of FIGS. 1-2.

Further, it is understood that some components in the system are not explicitly shown in FIG. 4. For example, transmission of information described with respect to FIG. 4 can be communicated via one or more entities (e.g., proxy services, computers, APIs, etc.), some of which may not be shown in FIG. 4, as described in FIG. 1 and FIG. 2.

At step 1, registration server 402 may redirect mobile application 414 to a registration page to initiate a registration process for user 401 operating user device 410. The registration page may request user 401 to input user information to perform the registration process. In some cases, registration server 402 may be part of processor server computer 460, such that registration server 402 may enable registration services in conjunction with the application platform module of processor server computer 460, such as application platform module 132 of FIGS. 1-2.

At step 2, user 401 may input user information into mobile application 414, which may then process the received user information. In some cases, the user information may include authentication information (e.g., biometric information) so that user device 410 can determine that the authentic user is performing the registration process based on the authentication information before proceeding. Subsequently, mobile application 414 may call user API 416 (e.g., electronic identifier services API 133 of FIG. 1) to request generation of an electronic identifier (shown as "eID" in FIG. 4) associated with user 401. The generated electronic identifier may then be returned to mobile application 414. Further details regarding generation of the electronic identifier are described above with respect to FIG. 1.

At step 3, mobile application 414 may send a request to verify profile information associated with user 401 to profile verification computer 420. Profile verification computer 420 may perform a verification process to determine whether user 401 can be verified. Profile verification computer 420 may send a verification result to mobile application 414, which may indicate that user 401 was verified. This verification process can indicate that user 401 can be trusted to connect to ledger management network 470. Further details regarding the verification of user 401 based on profile information are described above with respect to FIG. 1.

In some embodiments, the electronic ledger may be updated with information based on completion of step 2 and step 3. For example, information indicating the generation of the electronic identifier associated with user 401 and the verification result provided by profile verification computer 420 may be sent to user proxy 418, which may then send a request to ledger management network 470 to update the electronic ledger with this information. In some cases, the request may indicate the public account address (e.g., hashed public key) associated with user 401, so that this information indicating issuance of the electronic identifier may be stored in a record associated with user 401 in the electronic ledger. In some cases, operating entity 480, which may have been involved in the process of generating and verifying electronic identifier as well as verifying profile information of the user as described in FIG. 1, may digitally sign the information and update the ledger with the information.

At step 4, mobile application 414 may send a request to authorization computer 440 to activate an account associated with user 401. In some cases, mobile application 414 may send user information input by user 401, profile verification information (e.g., verification result), the electronic identifier associated with user 401, and other information to indicate to authorization computer 440 that user 401 has been authenticated. In some embodiments, authorization computer 440 may call authorization entity API 426 (e.g., authorization services API 135 of FIG. 1) to check whether the verification result determined by profile verification computer 420 indicates that user 401 was verified and if so, certify the electronic identifier associated with user 401. In some embodiments, authorization computer 440 may certify the electronic identifier by digitally signing the electronic identifier using their own private key.

In some embodiments, the electronic ledger may be updated based on completion of step 4. For example, the electronic identifier digitally signed by authorization computer 440 may be sent to authorization entity proxy 428. Authorization entity proxy 428 may then send a request to ledger management network 470 to update the electronic ledger to indicate that authorization computer 440 certified the electronic identifier associated with user 401.

Subsequently, authorization computer 440 may activate the account associated with user 401. Authorization computer 440 may issue an account hosted by authorization computer 440. In some embodiments, authorization computer 440 may be an issuer computer that can activate the account for user 401 by issuing a payment account for user 401 and generating payment account information, such as an account identifier (e.g., primary account number), associated with the account. Authorization computer 440 may then associate the account information of the issued account with a public account address (e.g., hashed public key) associated with user 401, where the public account address may be utilized to indicate all information stored in the electronic ledger that is associated with user 401. In some embodiments, user 401 may be assigned a public-private key pair when performing the registration process in steps 2 or 3, and as described in more detail with respect to FIG. 1.

At step 5, user 401 may utilize information issued during the registration process. In some cases, user 401 may request a resource provider for access to a resource, such as access to an event at a physical location. User 401 may present user device 410 to a resource provider device 450 associated with the resource provider. User device 410 and resource provider device 450 may establish a wireless connection (e.g., NFC, Wi-Fi, Bluetooth, etc.) over which user device 410 may send the electronic identifier associated with user 401 and a cryptogram to resource provider device 450. Generation of the cryptogram is discussed in further detail with respect to FIG. 5. Resource provider device 450 may verify the cryptogram received from user device 410 and then call resource provider API 436 (e.g., electronic identifier services API 133 of FIG. 2) to also verify the received electronic identifier. Resource provider API 436 may send a request to resource provider proxy 438 to determine whether the electronic identifier can be verified based on information stored in the ledger.

Resource provider proxy 438 may forward the request to ledger management network 470. Operating entity 480 may then determine whether there exists a record that the electronic identifier is certified. In this case, operating entity 480 may determine, based on information indicated by ledger management network 470, that the ledger indicates that the electronic identifier was certified (e.g., digitally signed) by authorization computer 440 as described in step 4. Ledger management network 470 may verify the digital signature of authorization computer 440 using the public key of authorization computer 440 and thus determine that the electronic identifier received from user device 410 is valid. Subsequently, the resource provider may allow user 401 access to the resource, such as allowing user 401 entry into the physical location.

Figure 5:
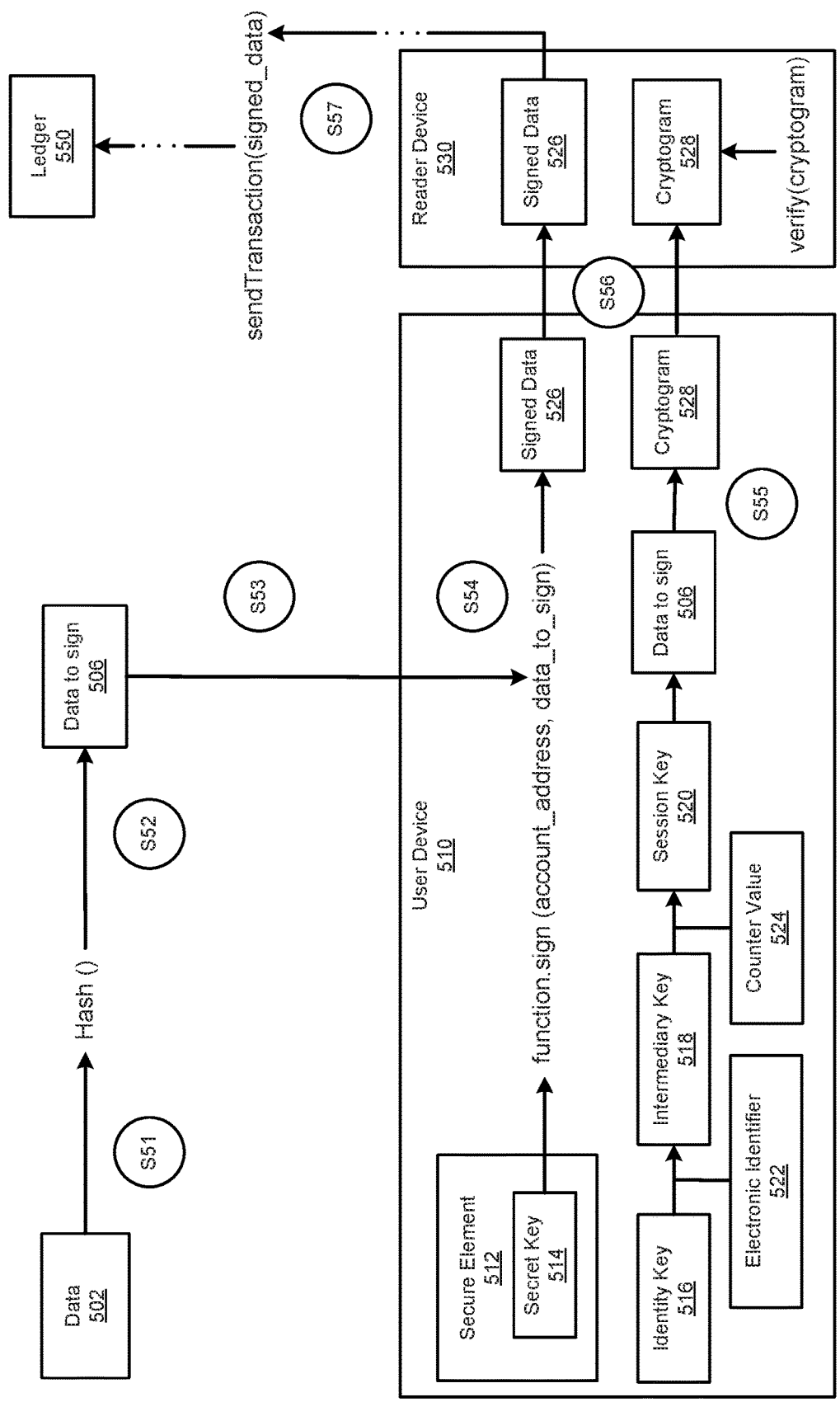
FIG. 5 shows a flow diagram of an exemplary process according to embodiments of the present invention.

FIG. 5 depicts an exemplary flow diagram 500 according to embodiments of the invention. Flow 500 shows how data associated with a user device may be processed before being included in the electronic ledger. It is understood that user device 510 may include similar features to those of user device 110 of FIGS. 1-2, user device 302 of FIG. 3, and user device 410 of FIG. 4. Additionally, it is understood that reader device 530 may also be known as a resource provider device and may include similar features to those of resource provider device 210 of FIG. 2 and resource provider device 450 of FIG. 4.

User device 510 may be operated by a user that requests a resource provider for access to a resource (e.g., access into a physical location). User device 510 may be in communication with reader device 530 associated with the resource provider. User device 510 may be running a mobile application that may be hosted by a remote server computer, such as a processor server computer with which the user conducted a previous registration process as described with respect to FIG. 1 and FIG. 4. In order to receive access, the user may utilize the mobile application to request to be authenticated based on information in the electronic ledger of the distributed ledger system. For example, the user may perform one or more of navigating to a page on the mobile application for sending a request for access, input information related to the request into the mobile application, and input an indication (e.g., by activating a button) to initiate transmission of the request.

At step S51, data 502 may be determined. Data 502 can include any suitable information related to the request for access by the user. In some embodiments, data 502 may include a date and time of the request, identification information associated with the user and the resource provider, authentication information for the user, a device identifier associated with user device 510, an account identifier of an account associated with the user, information indicating the resource being requested, or other information. Some information included in data 502 may be information input by the user into user device 510 or gathered from the remote server computer hosting the mobile application utilized by the user.

At step S52, data 502 may be hashed. The hashing may be performed utilizing a hash function that enables a one-way cryptographic function. Any suitable hash function (e.g., SHA-2 hash functions) may be utilized to hash data 502. Hashing data 502 may output the data to sign 506. In an exemplary case, the secure hash algorithm SHA-256 may be utilized to hash data 502, so that the resulting data to sign 506 may be a digest of 256 bits.

At step S53, data to sign 506 may be provided to user device 510. It is understood that steps S51 through S53 may be performed by user device 510 in communication with remote server computer hosting the mobile application running on user device 510. For example, in some cases, user device 510 can derive the data to sign 506. In other cases, the remote server computer may determine the data to sign 506 based on data 502 and the hash function and provide the data to sign 506 to user device 510 via the mobile application.

At step S54, user device 510 may digitally sign the data to sign 506 to determine signed data 526. In some cases, user device 510 may digitally sign the data to sign 506 utilizing a secret key 514 stored in a secure element 512 of user device 510. In some embodiments, the secret key 514 may be a private key of a public-private key pair associated with the user operating user device 510. The public-private key pair may be issued to the user (e.g., provisioned to user device 510) during the previous registration process performed with the remote server computer.

At step S55, user device 510 may generate a cryptogram 528. Cryptogram 528 may be a dynamically generated value that is unique to the request processed in flow 500. Cryptogram 528 may be generated by encrypting the data to sign 506 with a session key 520, which may be a dynamic value. It is understood that any suitable algorithms may be utilized to generate the cryptographic keys shown in FIG. 5. For example, additional parameters not explicitly shown may be utilized to derive intermediary key 518 and session key 520. Some exemplary additional parameters that can be utilized include nonces, random values, counter values, or other unique values. In some implementations, the derivation method for cryptogram 528 may be unique to user device 510 or a group of user devices.

Session key 520 may be generated based on an intermediary key 518 and a counter value 524. The counter value 524 may be an number that is updated (e.g., increased by one) for each iteration such that a different counter value is utilized for generation of each cryptogram. In some embodiments, intermediary key 518 may be a static key that is generated based on identity key 516 and electronic identifier 522. In other embodiments, intermediary key 518 may be a limited use key that is valid for a limited number of uses (e.g., one or more uses). The limited use key may be generated in any suitable manner using one or more dynamic values. For example, the limited use key may be generated utilizing a nonce in addition to identity key 516 and electronic identifier 522. In other cases, the limited use key may be generated using a dynamic value instead of the electronic identifier 522 that is shown in FIG. 5. In some cases, identity key 516 may be a shared secret provided to user device 510 at an earlier time by an authorized entity that can verify the cryptogram and electronic identifier 522 may be stored by user device 510 during a previous registration process.

At step S56, user device 510 may send the signed data 526 and cryptogram 528 to a reader device 530, which may initiate a verification process for cryptogram 258. In some embodiments, reader device 530 may verify cryptogram 528, In some cases, reader device 530 may verify the cryptogram while in communication with a remote server computer that can send information to reader device 530 over a wireless network. In some cases, the remote server computer may be a resource provider computer associated with the resource provider operating reader device 530.

In order to verify cryptogram 528, the reader device 530 may determine a key to decrypt cryptogram 528 and then decrypt cryptogram 528 using the key. In some cases, this key may be a session key 520, which can be derived based an algorithm. In some cases, reader device 530 may know the algorithm utilized to generate session key 520 or may receive information indicating the algorithm from the remote server computer. In some cases, reader device 530 may receive some information from user device 510 for generating session key 520. For example, user device 510 may provide reader device 530 some dynamic values that can be utilized to generate session key 520, such as counter value 524, so that reader device 530 has all the parameters to complete generation of session key 520. Upon generation of session key 520, reader device 530 may decrypt cryptogram 528 using session key 520 to obtain a first value (e.g., data to sign 506). Reader device 530 may then decrypt signed data 526 using the public key associated with user device 510 to obtain a second value (e.g., data to sign 506). Reader device 530 may then compare the first value with the second value. If the comparison shows that the two values match, this can indicate that cryptogram 528 is verified. Accordingly, reader device 530 may determine that cryptogram 528 is valid and may proceed to perform step S57.

The use of the cryptogram as shown in flow 500 increases security of the computer system as a whole. For example, verification of the cryptogram can ensure that a request to include information in the electronic ledger received from the user device is authentic. This is because it would be difficult for a malicious entity to guess the algorithm and parameters for generating an accurate cryptogram, especially since it is a dynamic value. Since a malicious entity cannot pose as an authentic user without the accurate cryptogram, the chance that a fraudulent request to update the electronic ledger is successful can be reduced. Further, for a fraudulent entity to perform fraudulent activity, the fraudulent entity must have identity key 516 that is specific to user device 510, as well as electronic identifier 522 that is specific to the user operating user device 510. Thus, embodiments of the invention improve the data security over conventional systems.

At step S57, reader device 530 may send a request to include signed data 526 to a ledger 550. It is understood that before signed data 526 can be added to ledger 550, one or more authorized entities may further process signed data 526. For example, signed data 526 may be formatted so that it is in a format compatible with ledger 550. Exemplary entries in a ledger are shown in FIG. 6.

FIG. 6 depicts a number of exemplary entries in an electronic ledger according to embodiments of the invention. In some embodiments, the electronic ledger may be in the form of a blockchain. Data originating from user devices can be stored in data block entries of the electronic ledger. Each entry may comprise a data header that includes information that makes the new entry unalterable without detection. For example, the data header may include a hash of the previous entry and a root value calculated based on all past data block entries. Since each entry in the ledger may be generated in a similar manner by including a data header storing information referencing its previous entry and all previous entries, no entry can be modified without affecting all following entries. This ensures that any tampering of information will not go unnoticed.

In some embodiments, each data block entry may include data associated with one or more events (e.g., transactions). In some embodiments, an event may comprise a sender providing a resource to a recipient. In such cases, the data may include a date and time, recipient identification data (e.g., recipient identifiers, electronic identifier, etc.), sender identification data (e.g., sender identifiers), one or more device identifiers associated with devices operated by the sender and the recipient, and resource details (e.g., type of resource, serial number, price, amount, etc.) related to each event. In some embodiments, data block entries may include digital signatures included by user devices or other authorized entities. The exemplary entries shown in FIG. 6 are not meant to be limiting. For example, data included in the data block entries may be different than that shown explicitly in FIG. 6. In some cases, the ordering of the included data fields may be different. Further, any of the data fields shown may be omitted or split into multiple data fields. In some cases, additional data fields relevant to recorded events may be included in the data entry blocks.

Conventional systems may utilize electronic ledgers to increase efficiency, but they are often not sufficiently secure. For example, they typically do not enable verification processes to ensure authenticity of specific end users or specific devices. This issue is exacerbated when these systems are operated based on anonymity of end users, which increases the risk that malicious entities can successfully pose as authentic users and attempt to add false data into an electronic ledger.

In contrast, embodiments of the invention provide a system that utilizes an electronic ledger to track information without compromising security. Embodiments of the invention include several mechanisms to increase security compared to conventional systems. For example, end users of the electronic ledger are authenticated by thorough authentication processes before being able to connect the electronic ledger network. For example, embodiments of the invention enable profile verification services that can verify profile information of a user operating a user device, so that only user devices associated with trusted users can connect to the electronic ledger network. Additionally, embodiments of the invention enable just authorized entities (e.g., resource provider computer, authorization computer, etc.) to update information in the electronic ledger, which forgoes typical anonymity surrounding entities that may manage information in the electronic ledger.

Further, embodiments of the invention can prevent malicious entities from posing as authentic users. For example, a user device cannot simply send a request to include some digitally signed data in an electronic ledger. Instead, embodiments of the invention provide a prerequisite for the user device to generate and submit a valid cryptogram to a reader device during a transaction. Verification of the cryptogram by another entity can ensure that the request to include information in the electronic ledger received from the user device is authentic. Since it would be difficult for a malicious entity to determine the algorithm and parameters for generating an accurate cryptogram, especially since it is a dynamic value, the chance that a fraudulent request to update the electronic ledger is successful can be reduced. Thus, embodiments of the invention provide benefits of an electronic system based on an electronic ledger while improving certain security issues of conventional systems.

It is understood that additional methods and processes may be included within the methods described herein and may be recognized by one of ordinary skill in the art, in light of the description below. Further, in some embodiments of the present invention, the described methods may be combined, mixed, and matched, as one of ordinary skill would recognize.

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

Specific details regarding some of the above-described aspects are provided above. The specific details of the specific aspects may be combined in any suitable manner without departing from the spirit and scope of embodiments of the technology. For example, back end processing, data analysis, data collection, and other transactions may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
   determining, by a user device, first data including an electronic identifier that is specific to a user operating the user device and identifies the user;
   obtaining, by the user device, a key stored in a secure element of the user device;
   digitally signing, by the user device, the first data using the key, to obtain a signed first data;
   determining, by the user device, a cryptogram using the first data, the determining the cryptogram comprising:
      determining a session key based on an intermediary key and a counter value that is a value increased by 1 each time the cryptogram is generated,
   wherein the intermediary key is generated using an identity key specific to the user device and the electronic identifier, and
      encrypting the first data using the session key; and
   providing, by the user device, the signed first data and the cryptogram to a reader device,
   wherein the reader device sends a request to include the signed first data in an electronic ledger upon verifying the cryptogram.

2. The method of claim 1, wherein the intermediary key is a limited use key.

3. The method of claim 1, wherein the intermediary key is a static key.

4. The method of claim 1, wherein providing the signed first data and the cryptogram to the reader device comprises:
detecting, by the user device, that the reader device is proximate; and
sending, by the user device, the signed first data and the cryptogram to the reader device over a short-range wireless connection.

5. A method comprising:
receiving, by a reader device from a user device operated by a user, a signed first data and a cryptogram, wherein the signed first data is determined by digitally signing first data, which includes an electronic identifier that is specific to the user and identifies the user, using a key stored in a secure element of the user device;
determining, by the reader device, whether the cryptogram can be verified; and
upon verifying the cryptogram, sending, by the reader device, a request to a remote server computer to include the signed first data in an electronic ledger,
wherein the cryptogram is determined by determining a session key based on an intermediary key and a counter value, which is a value increased by 1 each time the cryptogram is generated, and encrypting the first data using the session key, and
wherein the intermediary key is generated using an identity key specific to the user device and the electronic identifier.

6. The method of claim 5, further comprising:
upon determining that the cryptogram can be verified, verifying the cryptogram by the reader device, the verifying comprising:
determining, by the reader device, the session key;
decrypting, by the reader device, the cryptogram using the session key to determine a first value;
decrypting, by the reader device, the signed first data to determine a second value; and
determining, by the reader device, that the first value and the second value match.

7. The method of claim 6, further comprising:
receiving, by the reader device, one or more dynamic values utilized to generate the session key from the user device.

8. The method of claim 5, wherein receiving the signed first data and the cryptogram from the user device comprises:
detecting, by the reader device, that the user device is proximate; and
receiving, by the reader device, the signed first data and the cryptogram from the user device over a short-range wireless connection.

9. A user device comprising:
a processor; and
a computer readable medium coupled to the processor, the computer readable medium comprising code, executable by the processor, to perform a method including:
determining first data including an electronic identifier that is specific to a user operating the user device and identifies user;
obtaining a key stored in a secure element of the user device;
digitally signing the first data using the key, to obtain a signed first data;
determining a cryptogram using the first data, the determining the cryptogram including:
determining a session key based on an intermediary key and a counter value that is a value increased by 1 each time the cryptogram is generated, wherein the intermediary key is generated using an identity key specific to the user device and the electronic identifier, and
encrypting the first data using the session key; and
providing the signed first data and the cryptogram to a reader device,
wherein the reader device sends a request to include the signed first data in an electronic ledger upon verifying the cryptogram.

10. The user device of claim 9, wherein the intermediary key is a limited use key.

11. The user device of claim 9, wherein the intermediary key is a static key.

12. The user device of claim 9, wherein the providing the signed first data and the cryptogram to the reader device includes:
detecting that the reader device is proximate; and
sending the signed first data and the cryptogram to the reader device over a short-range wireless connection.

* * * * *

UNITED STATES PATENT AND TRADEMARK OFFICE
CERTIFICATE OF CORRECTION

| | |
|---|---|
| PATENT NO. | : 11,997,213 B2 |
| APPLICATION NO. | : 16/621665 |
| DATED | : May 28, 2024 |
| INVENTOR(S) | : Quan Wang |

It is certified that error appears in the above-identified patent and that said Letters Patent is hereby corrected as shown below:

In the Claims

In Claim 9, Column 26, Line 16, please remove "identifies user;" and insert -- identifies the user; --

Signed and Sealed this
Fifteenth Day of October, 2024

Katherine Kelly Vidal
*Director of the United States Patent and Trademark Office*